US011580257B2

(12) United States Patent
Nelluri et al.

(10) Patent No.: US 11,580,257 B2
(45) Date of Patent: Feb. 14, 2023

(54) SYSTEM FOR CONTEXT-BASED DATA STORAGE SCRUTINIZATION AND CAPTURE

(71) Applicant: Bank of America Corporation, Charlotte, NC (US)

(72) Inventors: Govindarajulu Nelluri, Hyderabad (IN); Suhasini Mullapudi, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 305 days.

(21) Appl. No.: 16/930,469

(22) Filed: Jul. 16, 2020

(65) Prior Publication Data

US 2022/0019688 A1 Jan. 20, 2022

(51) Int. Cl.
| | |
|---|---|
| *G06F 21/56* | (2013.01) |
| *H04L 29/06* | (2006.01) |
| *G06F 21/62* | (2013.01) |
| *G06F 16/951* | (2019.01) |
| *G06N 5/04* | (2023.01) |
| *G06N 20/00* | (2019.01) |

(Continued)

(52) U.S. Cl.
CPC ........ *G06F 21/6245* (2013.01); *G06F 16/951* (2019.01); *G06F 21/64* (2013.01); *G06N 5/04* (2013.01); *G06N 20/00* (2019.01)

(58) Field of Classification Search
CPC .... G06F 21/6245; G06F 16/951; G06F 21/64; G06N 5/04; G06N 20/00
See application file for complete search history.

(56) References Cited

U.S. PATENT DOCUMENTS

| | | | | |
|---|---|---|---|---|
| 2017/0324758 | A1* | 11/2017 | Hart | H04L 63/0428 |
| 2020/0053111 | A1* | 2/2020 | Jakobsson | H04L 63/1416 |
| 2022/0207140 | A1* | 6/2022 | Mooney, III | G06F 21/563 |

FOREIGN PATENT DOCUMENTS

EP 2990982 A1 * 3/2016 ......... G06F 16/3344

OTHER PUBLICATIONS

Biao Wan, Chunmei Xu; "Application Analysis of Computer Software Security Vulnerability Detection Based on Web Crawler"; AIAM2021: 2021 3rd International Conference on Artificial Intelligence and Advanced Manufacture; Oct. 2021; pp. 1969-1973 (Year: 2021).*

* cited by examiner

*Primary Examiner* — Kendall Dolly
*Assistant Examiner* — Courtney D Fields
(74) *Attorney, Agent, or Firm* — Moore & Van Allen PLLC; R. W. McCord Raybum (57) ABSTRACT

A system for context-based data scrutinization and capture is provided. The system comprises: a memory device with computer-readable program code stored thereon; a communication device connected to a network; a processing device, wherein the processing device is configured to execute the computer-readable program code to: monitor a data storage location using a crawler bot configured for scanning an artifact stored in the data storage location; scan the artifact, using the crawler bot, for one or more data fields, wherein at least one of the one or more data fields comprises unobscured private data; identify an artifact type for the artifact based on the one or more data fields; and capture the artifact from the data storage location based on the artifact and the unobscured private data, wherein capturing the artifact comprises temporarily removing the artifact from the data storage location.

20 Claims, 7 Drawing Sheets

(51) Int. Cl.
*G06F 21/64* (2013.01)
*G06F 21/55* (2013.01)

SYSTEM FOR CONTEXT-BASED DATA STORAGE SCRUTINIZATION AND CAPTURE

BACKGROUND

In the modern digital era, the need to store documents, files, and other data is growing exponentially. Digital storage of these artifacts is desirable, as it provides enhanced data security, ease of accessibility, reduction in carbon footprint (i.e., paperless), and scalability when compared to traditional hardcopy paper methods. For financial institutions in particular, additional and continuous measures must be taken to ensure the security of stored data. As such, there exists a need for an improved data management and security system that actively monitors a data storage location and remediates identified anomalies.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system for context-based data scrutinization and capture is provided. The system comprises: a memory device with computer-readable program code stored thereon; a communication device connected to a network; a processing device, wherein the processing device is configured to execute the computer-readable program code to: monitor a data storage location using a crawler bot configured for scanning an artifact stored in the data storage location; scan the artifact, using the crawler bot, for one or more data fields, wherein at least one of the one or more data fields comprises unobscured private data; identify an artifact type for the artifact based on the one or more data fields; and capture the artifact from the data storage location based on the artifact and the unobscured private data, wherein capturing the artifact comprises temporarily removing the artifact from the data storage location.

In one specific embodiment, the system further comprises a context identification component configured for identifying the artifact type for the artifact and generating a context rule set for the artifact. In another embodiment, the context rule set defines usage of the unobscured private information compared to the artifact type and the one or more data fields. In yet another embodiment, the data storage location is a first data storage location, and wherein capturing the artifact further comprises: determining a second data storage location for the artifact based on the artifact type, the one or more data fields, and the context rule set for the artifact; and moving the artifact from the first data storage location to the second data storage location.

In yet another embodiment, the processing device is further configured to train the crawler bot with sample artifact data and real-time artifact data stored in the data storage location. In yet another embodiment, training the crawler bot further comprises leveraging a machine learning engine configured for identifying artifact types and data entries from a collection of artifacts.

In yet another embodiment, identifying the artifact type further comprises dividing the artifact into individual artifact components based on the one or more data fields.

In yet another embodiment, scanning the artifact for the one or more data fields further comprises identifying the one or more data fields using optical character recognition.

In yet another embodiment, the artifact is selected from a group consisting of data, a document, an image, a video, and a file.

A computer-implemented method for context-based data scrutinization and capture is also provided. The computer-implemented method comprising: monitoring a data storage location using a crawler bot configured for scanning an artifact stored in the data storage location; scanning the artifact, using the crawler bot, for one or more data fields, wherein at least one of the one or more data fields comprises unobscured private data; identifying an artifact type for the artifact based on the one or more data fields; and capturing the artifact from the data storage location based on the artifact and the unobscured private data, wherein capturing the artifact comprises temporarily removing the artifact from the data storage location.

In one specific embodiment, a context identification component is configured for identifying the artifact type for the artifact and generating a context rule set for the artifact. In another embodiment, the context rule set defines usage of the unobscured private information compared to the artifact type and the one or more data fields. In yet another embodiment, the data storage location is a first data storage location, and wherein capturing the artifact further comprises: determining a second data storage location for the artifact based on the artifact type, the one or more data fields, and the context rule set for the artifact; and moving the artifact from the first data storage location to the second data storage location.

In yet another embodiment, the computer-implemented method further comprises training the crawler bot with sample artifact data and real-time artifact data stored in the data storage location. In yet another embodiment, training the crawler bot further comprises leveraging a machine learning engine configured for identifying artifact types and data entries from a collection of artifacts.

In yet another embodiment, identifying the artifact type further comprises dividing the artifact into individual artifact components based on the one or more data fields.

A computer program product for context-based data scrutinization and capture is also provided. The computer program product comprises a non-transitory computer-readable medium comprising computer-readable instructions, the computer-readable instructions, when executed by a processing device, cause the processing device to: monitor a data storage location using a crawler bot configured for scanning an artifact stored in the data storage location; scan the artifact, using the crawler bot, for one or more data fields, wherein at least one of the one or more data fields comprises unobscured private data; identify an artifact type for the artifact based on the one or more data fields; and capture the artifact from the data storage location based on the artifact and the unobscured private data, wherein capturing the artifact comprises temporarily removing the artifact from the data storage location.

In one specific embodiment, the computer program product comprises a context identification component configured for identifying the artifact type for the artifact and generating a context rule set for the artifact. In another embodiment, the context rule set defines usage of the unobscured private information compared to the artifact type and the one or more data fields. In yet another embodiment, the data storage location is a first data storage location, and wherein capturing the artifact further comprises: determining a second data storage location for the artifact based on the artifact type, the one or more data fields, and the context rule set for the artifact; and moving the artifact from the first data storage location to the second data storage location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the invention, as described herein, leverage complex, specific-use computer system to provide a novel approach for improved data storage security through active data storage scrutinization and remediation. The system of the invention is configured to actively monitor one or more data storage locations of an entity or enterprise for detected anomalies within the stored data artifacts (e.g., documents, images, files, other data). These storage locations may store private data that can include personal, private, or secure identifying data that a user may prefer to remain secure and/or private while limiting exposure. The system monitors the storage locations by deploying a bot to crawl and scan through the stored data and identify potential anomalies such as unobscured private information that may lead to data vulnerabilities. The system further comprise a document scrutinizer component configured to receive items identified by the bot and determine a context of each artifact and usage of the unobscured private data. The artifacts associated with the determined anomalies are moved out of a production environment to a separate quarantine storage location until all issues are resolved. In some cases, the system may confirm initial indications of unobscured data or misuse or alternatively identify false positives through additional processing and examination. Those artifacts quarantined by the system and confirmed as requiring remediation may then be modified by the system to remove the unobscured private data through, for example, replacement of the private data with alternative data or other data masking techniques.

In contrast, conventional data storage security systems and methods are reactive, wherein anomalies or potential of exposure of private data is only flagged after an artifact containing said data is attempted to be shared, published, or the like be it accidental or purposeful. For example, a conventional system may only identify private data in an email attachment being sent to an external third party only after a sensitive artifact has been attached and attempted to be sent. Alternatively, the present invention provides an active monitoring and continuous remediation approach to enhance data security and limit exposure possibility. The system actively scans and crawls through data storage locations to identify and remediate issues, ideally, before the files are used. In this way, the system improves data storage security and limits private data exposure by addressing a problem present in conventional storage methods.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

As used herein, the term "artifact" may refer to any electronic data stored within a data storage location. Non-limiting examples of an artifact include documents, images, videos, files, and the like. In some embodiments, an artifact may include electronic records of physical documents or items such as a scanned image of a photograph or form.

As used herein, the term "computing resource" may refer to elements of one or more computing devices, networks, or the like available to be used in the execution of tasks or processes. A computing resource may be used to refer to available processing, memory, and/or network bandwidth, data usage or data transfer bandwidth or limits, and/or power of an individual computing device as well a plurality of computing devices that may operate as a collective for the execution of one or more tasks (e.g., one or more computing devices operating in unison). In some embodiments, user resources such as computing resources may include an amount of use-time during which the resources are being utilized by the system and/or other systems and devices described herein. In some embodiments, a "data storage resource" or "storage resource" may refer to computing resources to be used in the storage and/or transfer of data between data storage locations such as data storage hardware or network locations. Data storage resources may further include computer storage devices and data storage locations such as hard drives, solid state drives, storage area networks, and the like.

As used herein, the term "user" may refer to any entity or individual associated with the context-based data scrutinization and remediation system. In some embodiments, a user may be a computing device user, a phone user, a mobile device application user, a customer of an entity or business (i.e., an interaction or transaction provider), a system operator, and/or employee of an entity (e.g., a financial institution). In one embodiment, the user is an individual or customer interacting with one or more devices within the system. In another embodiment, a user may be a system administrator, technician, software or application developer, computer engineer, support associate, or the like associated with the context-based data scrutinization and remediation system and/or a data storage location utilized by the system. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

As used herein the term "user device" may refer to any device that employs a processor and memory and can perform computing functions, such as a personal computer or a mobile device, wherein a mobile device is any mobile communication device, such as a cellular telecommunications device (i.e., a cell phone or mobile phone), a mobile Internet accessing device, or other mobile device. Other types of mobile devices may include laptop computers, tablet computers, wearable devices, cameras, video recorders, audio/video player, ATMs, global positioning system (GPS) devices, or any combination of the aforementioned. The device may be used by the user to access the system directly or through one or more applications, an online portal, internet browser, virtual private network, or other connection channel. The user device comprises a display for providing a user interface to the user for interacting with an application displayed on the device and presented to the user. In some embodiments, a user device may comprise a clock/timer or counter, camera, location sensor (e.g., GPS), or the like.

As used herein, the term "entity" may be used to include any organization or collection of users that may interact with the context-based data scrutinization and remediation system. An entity may refer to a business, company, or other organization that either maintains or operates the system or requests use and accesses the system. In one embodiment, an entity may include a data storage provider. In one embodiment, the entity may be a business or financial entity. The terms "financial institution" and "financial entity" may be used to include any organization that processes financial transactions including, but not limited to, banks, resource management firms, insurance companies and the like. In specific embodiments of the invention, use of the term "bank" is limited to a financial entity in which account-bearing customers conduct financial transactions, such as account deposits, withdrawals, transfers and the like. In other embodiments, an entity may be a business, organization, a government organization or the like that is not a financial institution. In some embodiment, an entity may be a business, vendor, or the like that provides a resource (e.g., goods, services, or other resources) to another user or entity via an interaction at an interaction location (e.g., within an application, a web site, brick-and-mortar location).

As used herein, "authentication information" may refer to any information that can be used to authenticate an identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to at least partially authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. In some embodiments, authentication information may refer to any information provided by a user, entity, or the like to verify an identify and/or status of the user, entity, data associated with a user or entity, or the like.

To "monitor" is to watch, observe, or check something for a special purpose over a period of time. The "monitoring" may occur periodically over the period of time, or the monitoring may occur continuously over the period of time. In some embodiments, a system may actively monitor a data source, data stream, database, data archive, data storage location, or other data structure, wherein the system reaches out to the database and watches, observes, or checks the database for changes, updates, and the like. In other embodiments, a system may passively monitor a database or data stream, wherein the database or data stream provides information to the system and the system then watches, observes, or checks the provided information. In some embodiments, "monitoring" may further comprise analyzing or performing a process on something such as a data source or data stream either passively or in response to an action or change in the data source or data stream. In a specific embodiment, monitoring may comprise scanning data artifacts stored in a data storage location. Monitoring of user data streams is performed by the system with approval or authorization by the monitored user device and user.

As used herein, an "interaction" may refer to any action or communication between one or more users, one or more entities or institutions, and/or one or more devices or systems within the system environment described herein. For example, an interaction may refer to a user interaction with a system or device, wherein the user interacts with the system or device in a particular way. In one embodiment, interactions may be received or extracted through use interaction with a data stream (e.g., in real-time). In some embodiments, an interaction comprises a data transfer between devices or locations within the environment of the system described herein. For example, an interaction may require a transfer or migration of data between data storage locations.

In some embodiments, an interaction may further include user interactions with a user interface of a user application (e.g., clicking, swiping, text or data entry, etc.), authentication actions (e.g., signing-in, username and password entry, PIN entry, etc.), account actions or events (e.g., account access, fund transfers, document or record views and/or transfers, etc.) and the like. In another example, an interaction may refer to a user communication via one or more channels (i.e., phone, email, text, instant messaging, brick-and-mortar interaction, and the like) with an entity and/or entity system to complete an operation or perform an action. In yet another embodiment, an interaction may include any change in a data structure and/or data storage location.

Figure 1:
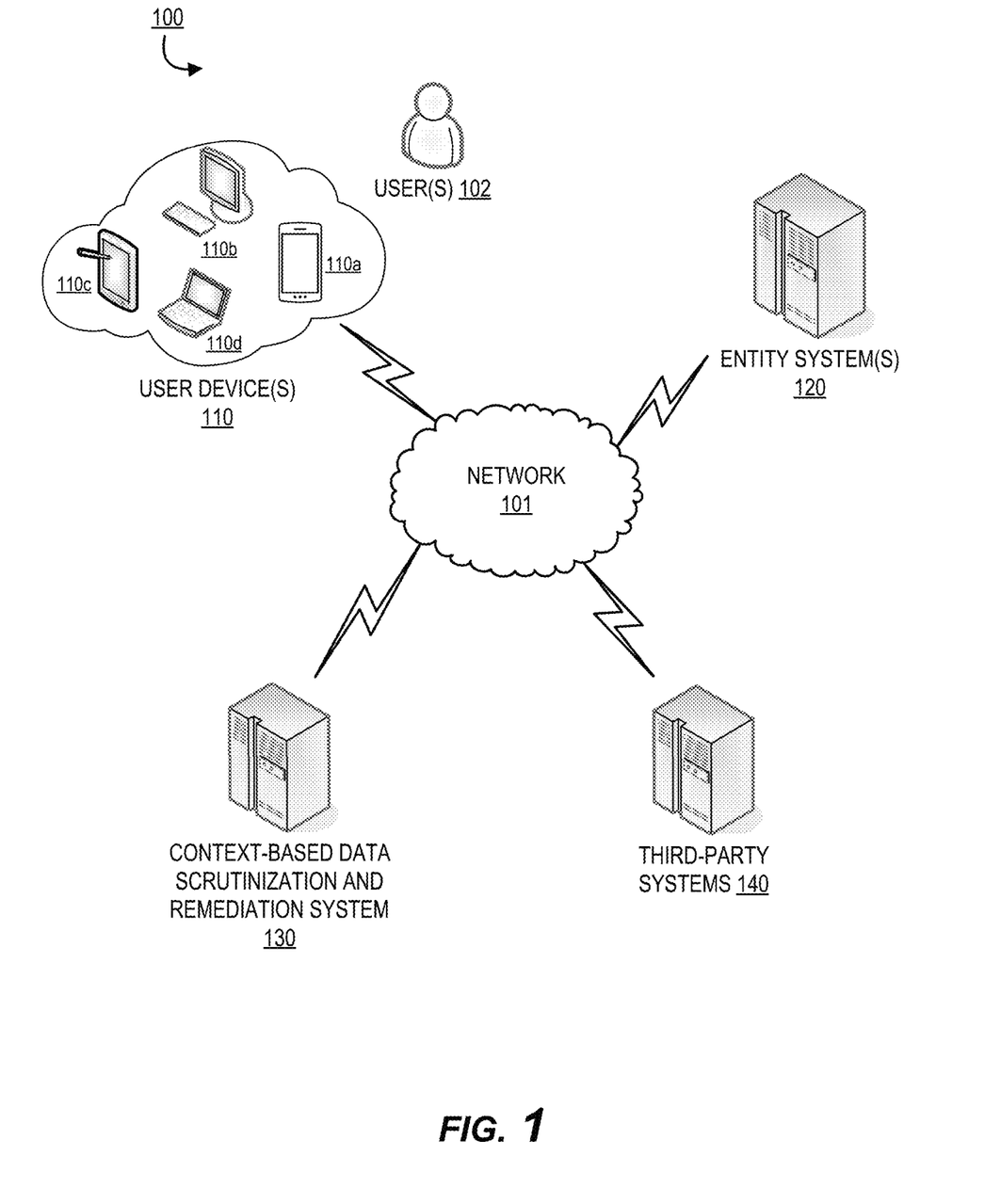
FIG. 1 provides a context-based data scrutinization and remediation system environment, in accordance with one embodiment of the invention.

FIG. 1 provides a context-based data scrutinization and remediation system environment 100, in accordance with one embodiment of the invention. As illustrated in FIG. 1, context-based data scrutinization and remediation system 130 is operatively coupled, via a network 101, to the user device(s) 110 (e.g., a plurality of user devices 110a-110d), the entity system(s) 120, and third party systems 140. In this way, the context-based data scrutinization and remediation system 130 can send information to and receive information from the user device 110, the entity system 120, and the third party systems 140. In the illustrated embodiment, the plurality of user devices 110a-110d provide a plurality of communication channels through which the entity system 120 and/or the context-based data scrutinization and remediation system 130 may communicate with the user 102 over the network 101.

FIG. 1 illustrates only one example of an embodiment of the system environment 100. It will be appreciated that in other embodiments, one or more of the systems, devices, or servers may be combined into a single system, device, or server, or be made up of multiple systems, devices, or servers. It should be understood that the servers, systems, and devices described herein illustrate one embodiment of the invention. It is further understood that one or more of the servers, systems, and devices can be combined in other embodiments and still function in the same or similar way as the embodiments described herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 is an individual interacting with one or more user devices either actively or passively, wherein the user devices are configured to interact and transmit commands to the context-based data scrutinization and remediation system 130. In one embodiment, the data stream may be generated or modified, for example, by one or more entity systems 120 while the data stream between the user device 110 and the entity system 120 is monitored by the context-based data scrutinization and remediation system 130 over the network 101. In an alternative embodiment, the user 102 is an individual interacting with the context-based data scrutinization and remediation system 130 over the network 101 and monitoring a transfer of data between the user devices 110 and the entity systems 120 using the context-based data scrutinization and remediation system 130 (e.g., an employee of the entity operating and/or monitoring the systems 120, 130).

Figure 2:
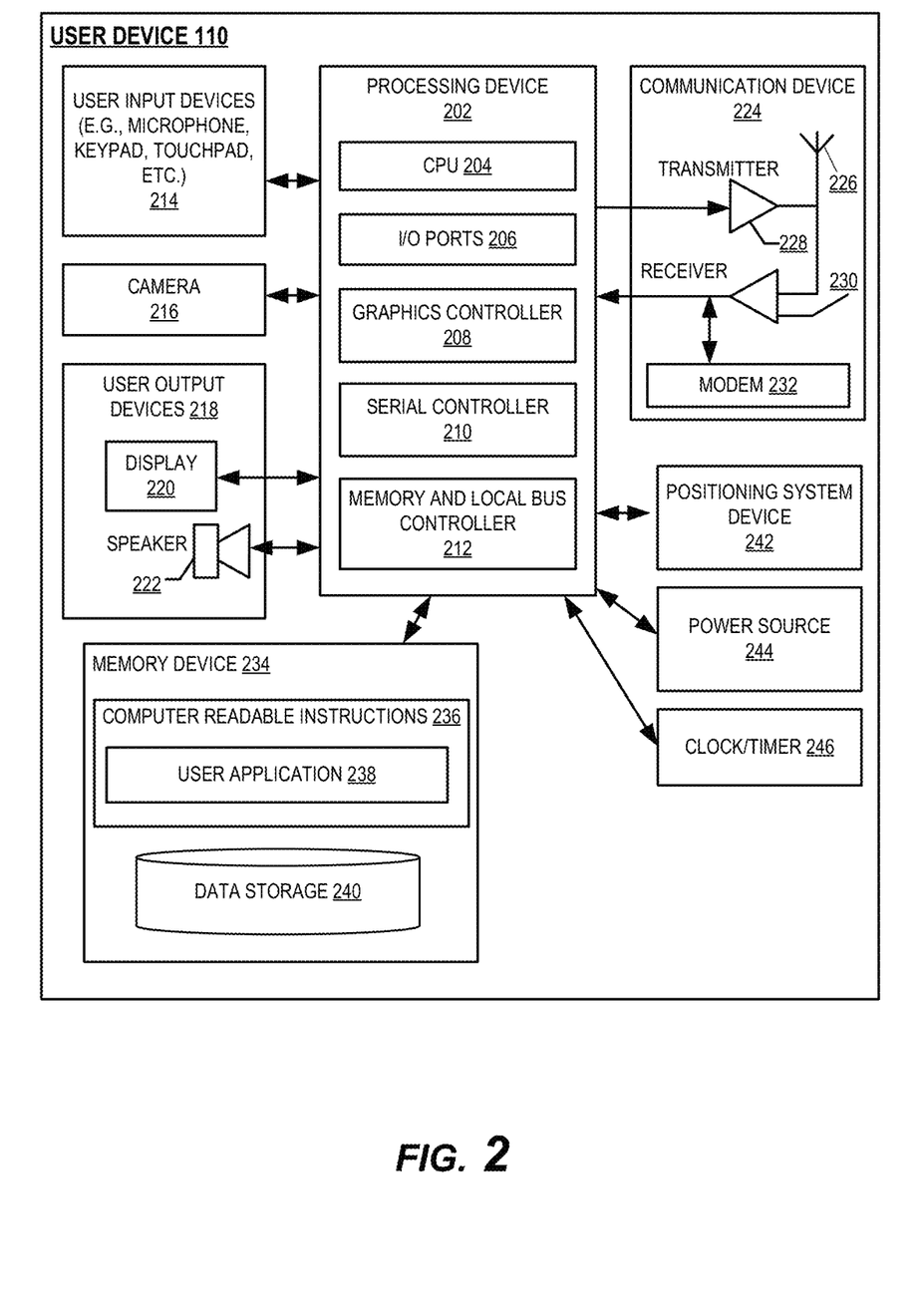
FIG. 2 provides a block diagram of a user device, in accordance with one embodiment of the invention.

FIG. 2 provides a block diagram of a user device 110, in accordance with one embodiment of the invention. The user device 110 may generally include a processing device or processor 202 communicably coupled to devices such as, a memory device 234, user output devices 218 (e.g., a user display device 220, or a speaker 222), user input devices 214 (e.g., a microphone, keypad, touchpad, touch screen, and the like), a communication device or network interface device 224, a power source 244, a clock or other timer 246, a visual capture device such as a camera 216, a positioning system device 242, and the like. In one embodiment, the camera 216 may include a scanner or any other image capturing device. The processing device 202 may further include a central processing unit 204, input/output (I/O) port controllers 206, a graphics controller or graphics processing device (GPU) 208, a serial bus controller 210 and a memory and local bus controller 212.

The processing device 202 may include functionality to operate one or more software programs or applications, which may be stored in the memory device 234. For example, the processing device 202 may be capable of operating applications such as the user application 238. The user application 238 may then allow the user device 110 to transmit and receive data and instructions from the other devices and systems of the environment 100. The user device 110 comprises computer-readable instructions 236 and data storage 240 stored in the memory device 234, which in one embodiment includes the computer-readable instructions 236 of a user application 238. In some embodiments, the user application 238 allows a user 102 to access and/or interact with other systems such as the entity system 120 via a user interface. In some embodiments, the user application 238 is an application for interacting with other systems and devices over a network.

The processing device 202 may be configured to use the communication device 224 to communicate with one or more other devices on a network 101 such as, but not limited to the entity system 120 and the context-based data scrutinization and remediation system 130. In this regard, the communication device 224 may include an antenna 226 operatively coupled to a transmitter 228 and a receiver 230 (together a "transceiver"), modem 232. The processing device 202 may be configured to provide signals to and receive signals from the transmitter 228 and receiver 230, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, and/or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processing device 202. Typically, the one or more applications 238, are loaded into the temporarily memory during use. As used herein, memory may include any computer readable medium configured to store data, code, or other information. The memory device 234 may include volatile memory, such as volatile Random Access Memory (RAM) including a cache area for the temporary storage of data. The memory device 234 may also include non-volatile memory, which can be embedded and/or may be removable. The non-volatile memory may additionally or alternatively include an electrically erasable programmable read-only memory (EEPROM), flash memory or the like.

Figure 3:
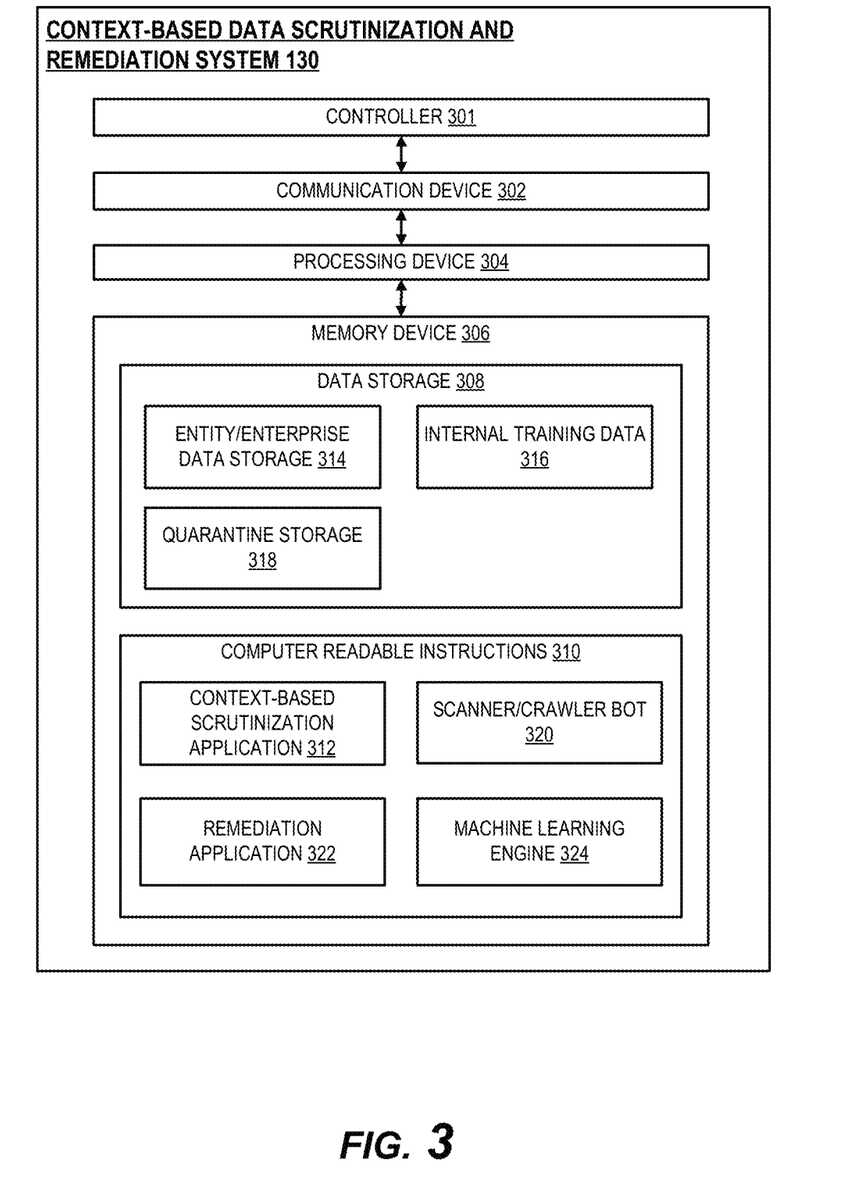
FIG. 3 provides a block diagram of a context-based data scrutinization and remediation system, in accordance with one embodiment of the invention.

FIG. 3 provides a block diagram of a context-based data scrutinization and remediation system 130, in accordance with one embodiment of the invention. The context-based data scrutinization and remediation system 130 generally comprises a controller 301, a communication device 302, a processing device 304, and a memory device 306.

As used herein, the term "controller" generally refers to a hardware device and/or software program that controls and manages the various systems described herein such as the user device 110, the entity system 120, third party systems 140, and/or the context-based data scrutinization and remediation system 130, in order to interface and manage data flow between devices and systems while executing commands to control the systems. In some embodiments, the controller may be integrated into one or more of the systems described herein. In other embodiments, the controller may be a separate system or device. In some embodiments, the controller may perform one or more of the processes, actions, or commands described herein.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 304 is operatively coupled to the communication device 302 and the memory device 306. The processing device 304 uses the communication device 302 to communicate with the network 101 and other devices on the network 101, such as, but not limited to the user device 110 and the entity system 120. As such, the communication device 302 generally comprises a modem, server, or other device for communicating with other devices on the network 101.

As further illustrated in FIG. 3, the context-based data scrutinization and remediation system 130 comprises computer-readable instructions 310 stored in the memory device 306, which in one embodiment includes the computer-readable instructions 310 of an context-based scrutinization application 312, a scanner or crawler bot 320, remediation application 322, and a machine learning engine 324.

The context-based scrutinization application 312 is configured to analyze the contents of monitored data storage locations and, specifically, those artifacts scanned and identified by the system as containing potentially sensitive information such as unobscured private data. The context-based scrutinization application 312 may be further configured to identify a usage or context of the artifact and any information within the artifact. The scanner or crawler bot 320 is configured to be deployed within a data storage location and scan the one or more artifacts or data contents of the location. The scanner or crawler bot 320 is configured to identify potentially sensitive data or other anomalies with the data storage location and transmit any flagged items for the context-based scrutinization application 312. The remediation application 322 is configured to modify the flagged artifacts containing unobscured private data or other anomalies. The remediation application 322 is configured to modify the artifacts to remove or alter any unwanted data in the artifacts before reintroducing the artifacts back to the data storage location. The machine learning engine 324 is configured to work with the context-based scrutinization application 312 and the scanner or crawler bot 320 to learn to identify private data and other anomalies in data artifacts as well as artifacts types and usage (i.e., context of information within a particular artifact).

In some embodiments, the memory device 306 includes data storage 308 for storing data related to the system environment, but not limited to data created and/or used by the context-based scrutinization application 312, scanner or crawler bot 320, remediation application 322, and machine learning engine 324. Data stored in the data storage 308 may comprise an entity/enterprise data storage 314 (i.e., data storage locations), internal training data 316, and quarantine storage 318.

In one embodiment of the invention, the context-based data scrutinization and remediation system 130 may associate with applications having computer-executable program code that instruct the processing device 304 to perform certain functions described herein. In one embodiment, the computer-executable program code of an application associated with the user device 110, third party systems 140, and/or the entity systems 120 may also instruct the processing device 304 to perform certain logic, data processing, and data storing functions of the application.

Embodiments of the context-based data scrutinization and remediation system 130 may include multiple systems, servers, computers or the like maintained by one or many entities. In some embodiments, the context-based data scrutinization and remediation system 130 may be part of the entity systems 120. In other embodiments, the entity systems 120 are distinct from the context-based data scrutinization and remediation system 130. The context-based data scrutinization and remediation system 130 may communicate with the entity systems 120 via a secure connection generated for secure encrypted communications between the two systems either over the network 101 or alternative to the network 101.

Figure 4:
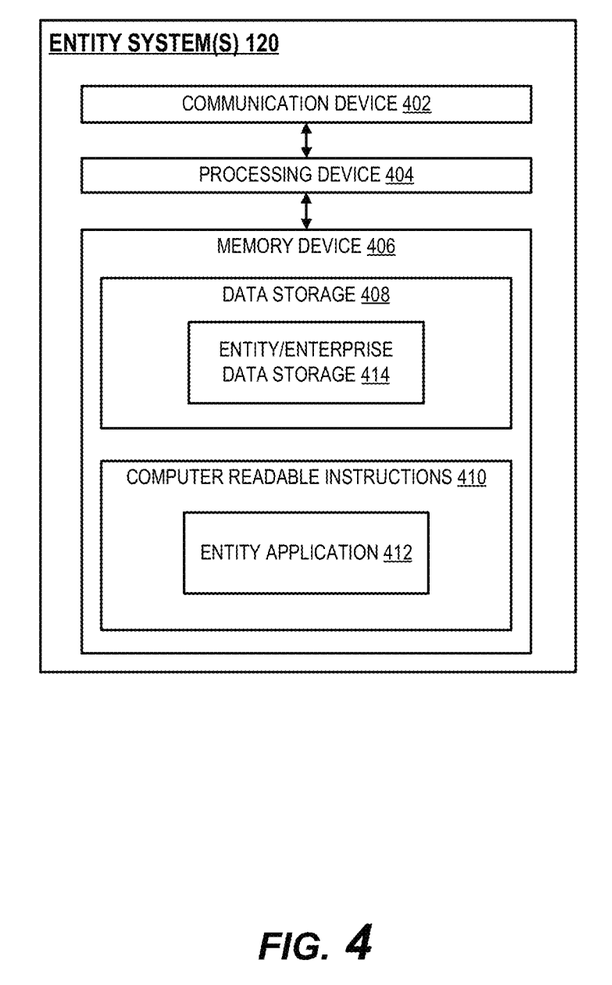
FIG. 4 provides a block diagram of an entity system, in accordance with one embodiment of the invention.

As illustrated in detail in FIG. 4, the environment 100 further includes one or more entity systems 120 which are connected to the user device 110, the context-based data scrutinization and remediation system 130, and the third party systems 140. The entity systems 120 may be associated with one or more entities, institutions, or the like. The entity systems 120 generally comprise a communication device 402, a processing device 404, and a memory device 406 further comprising data storage 408. The entity systems 120 comprise computer-readable instructions 410 stored in the memory device 406, which in one embodiment includes the computer-readable instructions of an entity application 412. The entity systems 120 may communicate with the user device 110, third party systems 140, and the context-based data scrutinization and remediation system 130 to provide access to information and accounts stored and maintained on the entity systems 120. In some embodiments, the entity system 120 may communicate with the context-based data scrutinization and remediation system 130 during an interaction with a user 102 in real-time, wherein user interactions may be monitored and processed by the context-based data scrutinization and remediation system 130. In some embodiments, data storage 408 comprises a entity/enterprise data storage 416 (i.e., data storage location) to either supplement or replace data storage of the context-based data scrutinization and remediation system 130 as previously discussed.

The systems of the environment 100 are configured to actively monitor one or more data storage locations of an entity or enterprise for detected anomalies within the stored data artifacts (e.g., documents, images, files, other data). These storage locations may store private data that can include personal, private, or secure identifying data that a user may prefer to remain secure and/or private while limiting exposure. The system monitors the storage locations by deploying a bot to crawl and scan through the stored data and identify potential anomalies such as unobscured private information that may lead to data vulnerabilities. The system further comprise a document scrutinizer component configured to receive items identified by the bot and determine a context of each artifact and usage of the unobscured private data. The artifacts associated with the determined anomalies are moved out of a production environment to a separate quarantine storage location until all issues are resolved. In some cases, the system may confirm initial indications of unobscured data or misuse or alternatively identify false positives through additional processing and examination. Those artifacts quarantined by the system and confirmed as requiring remediation may then be modified by the system to remove the unobscured private data through, for example, replacement of the private data with alternative data or other data masking techniques.

Figure 5:
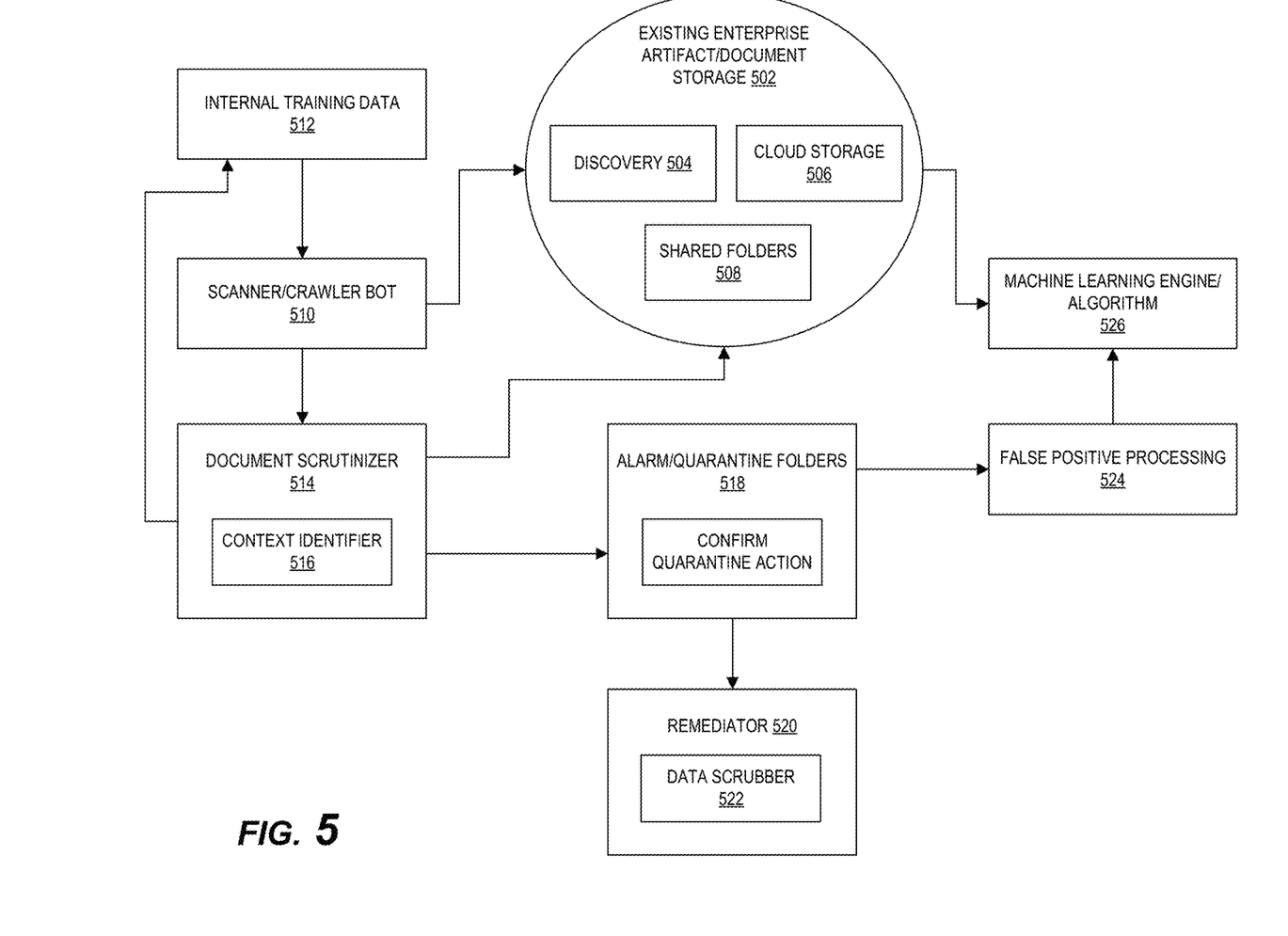
FIG. 5 provides an illustration of data flow within a context-based data scrutinization and remediation system, in accordance with one embodiment of the invention.

FIG. 5 provides an illustration of data flow within a context-based data scrutinization and remediation system, in accordance with one embodiment of the invention. The system of FIG. 5 comprises an existing enterprise artifact storage 502. In the exemplary embodiment of the figure, the artifact storage 502 is an electronic document storage location. In some embodiments, a data storage location may comprise private and/or public databases of one or more entities. In the non-limiting example of FIG. 5, the existing enterprise artifact storage 502 comprises discovery data 504, cloud storage 506, and shared folders 508 but may further include other data storage locations such as hard drives, servers, data banks, removable storage devices, network storage locations, and the like.

The system comprises a scanner or crawler bot 510 configured to be deployed into the existing enterprise artifact storage 502 and scan the one or more artifacts or data contents of the location. The scanner or crawler bot 510 is configured to identify or flag potentially sensitive data or other anomalies within artifacts stored in the data storage location and transmit flagged items for additional processing. In one embodiment the scanner or crawler bot 510 is a computer program configured to automatically search documents or other data within a collection of a data storage location. The scanner or crawler bot 510 identifies information from scanned artifacts, such as one or more data fields, and may initially categorize, index, and catalogue the artifacts for additional processing by the system. In some embodiments, once deployed within a data storage location the scanner or crawler bot 510 is configured to automatically and continuously crawl through and scan the contents of the data storage location even as the location is updated. In this way, the system may continuously monitor a data storage location and proactively identify potentially vulnerable information before it can be improperly used. In some embodiments, the scanner or crawler bot 510 is initially trained using internal training data 512 comprising previously identified artifacts, artifact types, and data entries. In some embodiments, the scanner or crawler bot 510 may further be trained using real-time data and output from a machine learning engine or algorithm 526 configured for identifying artifacts.

The system further comprises a document scrutinizer component 514 configured to receive artifacts initially identified by the scanner or crawler bot 510 and is further configured to analyze the contents of monitored data storage locations and, specifically, those artifacts scanned and identified by the system as containing potentially sensitive information such as unobscured private data. The document scrutinizer 514 may be further configured to identify a usage or context of the artifact and any information within the artifact. The document scrutinizer 514 comprises a context identifier component 516 configured to analyze an artifact, an assigned artifact type, one or more data entries of the artifact, and/or historical artifact information to determine a context or usage of the artifact and/or any contained data such as sensitive or private information. In some embodiments, a machine learning engine such as machine learning engine or algorithm 526 may be in communication with document scrutinizer 514 and be trained for identifying artifact type and data entry context.

In some embodiment, the document scrutinizer 514 is configured to approve of an artifact based on the artifact context and usage or flag an artifact, wherein approved artifacts are transmitted back to an original data storage location and a flagged artifact is transmitted to a alarm or quarantine folder 518. In some embodiments, the alarm or quarantine folder 518 is a separate data storage location, wherein flagged artifacts may be temporarily removed from the existing enterprise artifact storage 502. In one embodiment, the existing enterprise artifact storage 502 is a production environment and the alarm or quarantine folder 518 is a non-production environment. In some embodiments, the system is configured confirm a quarantine of an artifact in the alarm or quarantine folder 518. In one embodiment, the presence of a false positive may be identified by a user or entity maintaining the system, wherein false positive processing 524 of an artifact may reintroduce the artifact back to the existing enterprise artifact storage 502 and the model contained in the machine learning engine or algorithm 526 is updated to reflect and correct for the newly identified false positive.

Alternatively, the system is configured to process flagged artifacts contained in the alarm or quarantine folder 518 using remediator component 520. The remediator component 520 is configured to modify the artifacts to remove or alter any unwanted data in the artifacts before reintroducing the artifacts back to the data storage location. In the non-limiting embodiment of FIG. 5, the remediator component 520 comprises a data scrubber configured for removing sensitive or unwanted data from the artifact. In some embodiments, remediated or modified artifacts may be reintroduced to the existing enterprise artifact storage 502 at the and original or new data storage location (e.g., moved to a new subfolder)

Figure 6:
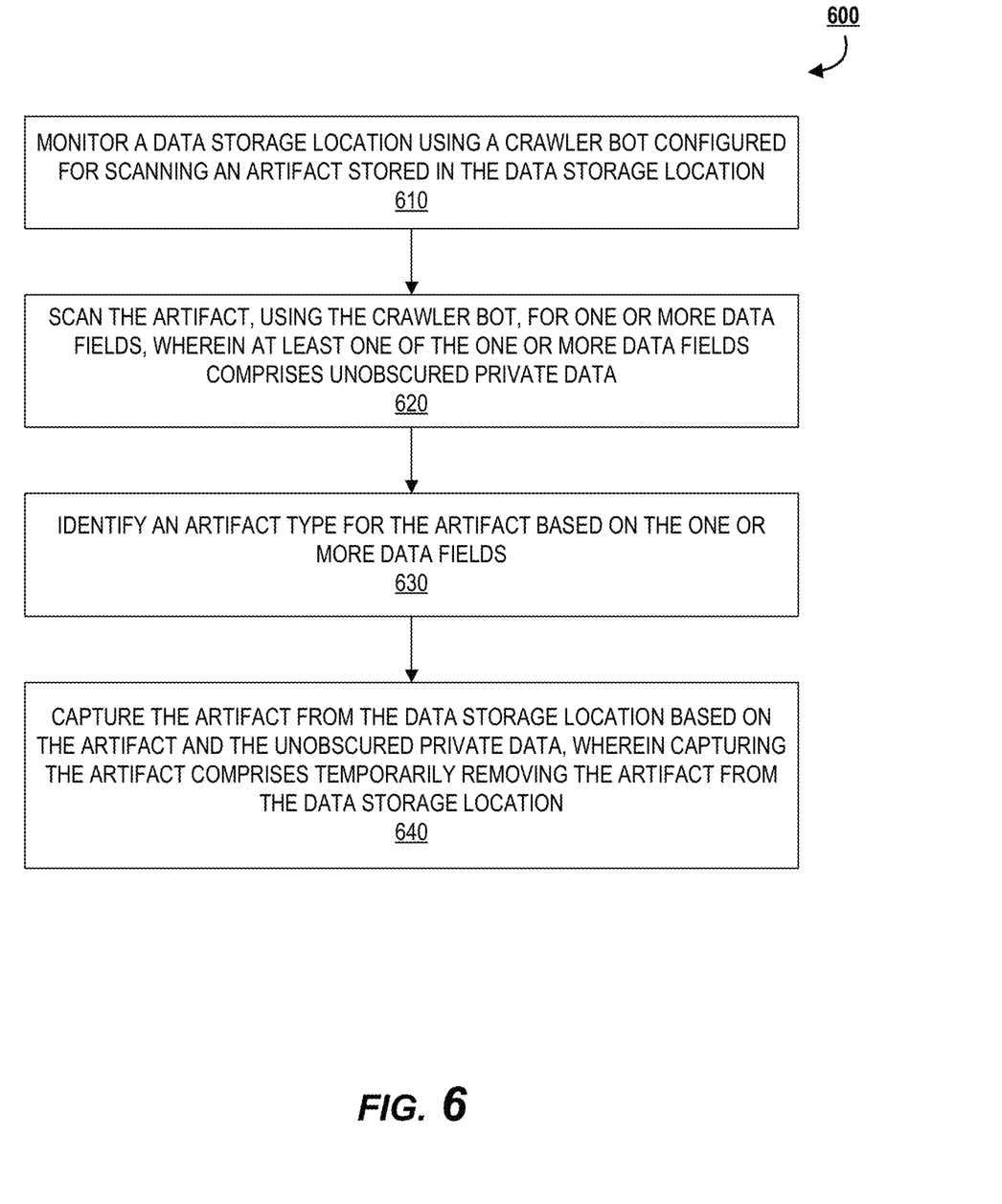
FIG. 6 provides a high level process flow for data storage scrutinization and capture, in accordance with one embodiment of the invention.

FIG. 6 provides a high level process flow for data storage scrutinization and capture, in accordance with one embodiment of the invention. In some embodiments, the process flow of FIG. 6 is executed or performed by the system environments of the previous figures. As illustrated at block 610 of FIG. 6, the system is configured to first monitor a data storage location using a crawler bot configured for scanning an artifact stored in the data storage location. As previously discussed, a crawler bot is a computer program configured to automatically search documents or other data within a collection of a data storage location. The crawler bot is configured to identify information from scanned artifacts, such as one or more data fields, and may initially categorize, index, and catalogue the artifacts for additional processing by the system. In some embodiments, once deployed within a data storage location the crawler bot is configured to automatically and continuously crawl through and scan the contents of the data storage location even as the location is updated. In this way, the system may continuously monitor a data storage location and proactively identify potentially vulnerable information before it can be improperly used. In some embodiments, crawler bot is initially trained using internal training data comprising previously identified artifacts, artifact types, and data entries. In some embodiments, the crawler bot may further be trained using real-time data and/or output from a machine learning engine or algorithm configured for identifying artifacts.

At block 620, the system is configured to scan the artifact, using the crawler bot, for one or more data fields. The system is configured to scan the one or more data fields of the artifact to identify unobscured private data or other anomalies (e.g., misspellings, errors, flagged words, etc.). The unobscured data may comprise, for example, personal, private, or secure identifying data that a user may prefer to remain secure and/or private while limiting exposure of said data. For example, unobscured private data may include a user's social security number, account numbers, financial account holdings values, addresses, usernames, passwords, and the like. In some embodiments the system leverages optical character recognition (OCR) technology to scan the artifact for unobscured private data and/or other anomalies. In one embodiment, the system compares scanned data fields to a known data field data base defining a number of actions for particular data fields, wherein upon the system identifying a particular word, the corresponding action is executed (e.g., moved to quarantine).

At block 630, the system is configured to identify an artifact type for the artifact based on the one or more data fields. Non-limiting examples of artifact types include internal documents, published documents, document types (e.g., a check, a bank statement, a screenshot), file types (e.g., an image, a video, an email attachment). In one specific example, the determined presence of an account number, a routing number, a signature, and a dollar amount may indicate that the artifact is a check. An artifact type defines a presumed end use of an artifact by a user or other systems and determine, in part, whether the presence of private data is unwarranted. For example, a user account number on a private bank statement may be permittable use of private data, while inclusion of the account number in a screenshot email attachment designated to be sent to a third party may not be desirable as it may expose the private data.

In this way, the system defines a context, end use, or usage of the data within the artifact. In some embodiments, the system is configured to assign a preexisting a context rule set or generate a new context rule set for an artifact based on the scanned data fields of the artifact, the artifact contents, the artifact type, and/or the artifact data storage location. The system may identify based on previously processed data that an artifact is a particular artifact type and apply a particular rule set governing processing and exposure of private data within the artifact type. For example, upon identifying an artifact as a check artifact type, the system may apply a check artifact rule set for removing sensitive information such as an account number, amount, or the like.

In some embodiments, the system is configured to scan an artifact and identify subsets of data within an artifact (e.g., a combination of public data and private data). The system may be configured to divide the data fields of the artifact into individual artifact components requiring different levels of scrutiny and processing based on the type of data contained in the corresponding data fields.

At block 640, the system is configured to capture or extract the artifact from an original data storage location based on determining the presence of unobscured private data that is not permittable or desirable for the artifact type. In some embodiments, capturing the artifact comprises removing the artifact from the original data storage location and moving the artifact to a new data storage location. The system may determine a new data storage location for the artifact based on the artifact type, the one or more data fields, and the context rule set for the artifact and move the artifact to the new location. For example, the system may determine that an original data storage location for a particular artifact was improper or an error, wherein the system may move the artifact to a new data storage location for that artifact type.

In some embodiments, the system may only temporarily remove an artifact from an original data storage location. In one embodiment, the system may temporarily remove the artifact from the original data storage location and place the artifact in a quarantine data storage location for additional processing or remediation. In some embodiments, a quarantine data storage location is a non-production storage environment.

Figure 7:
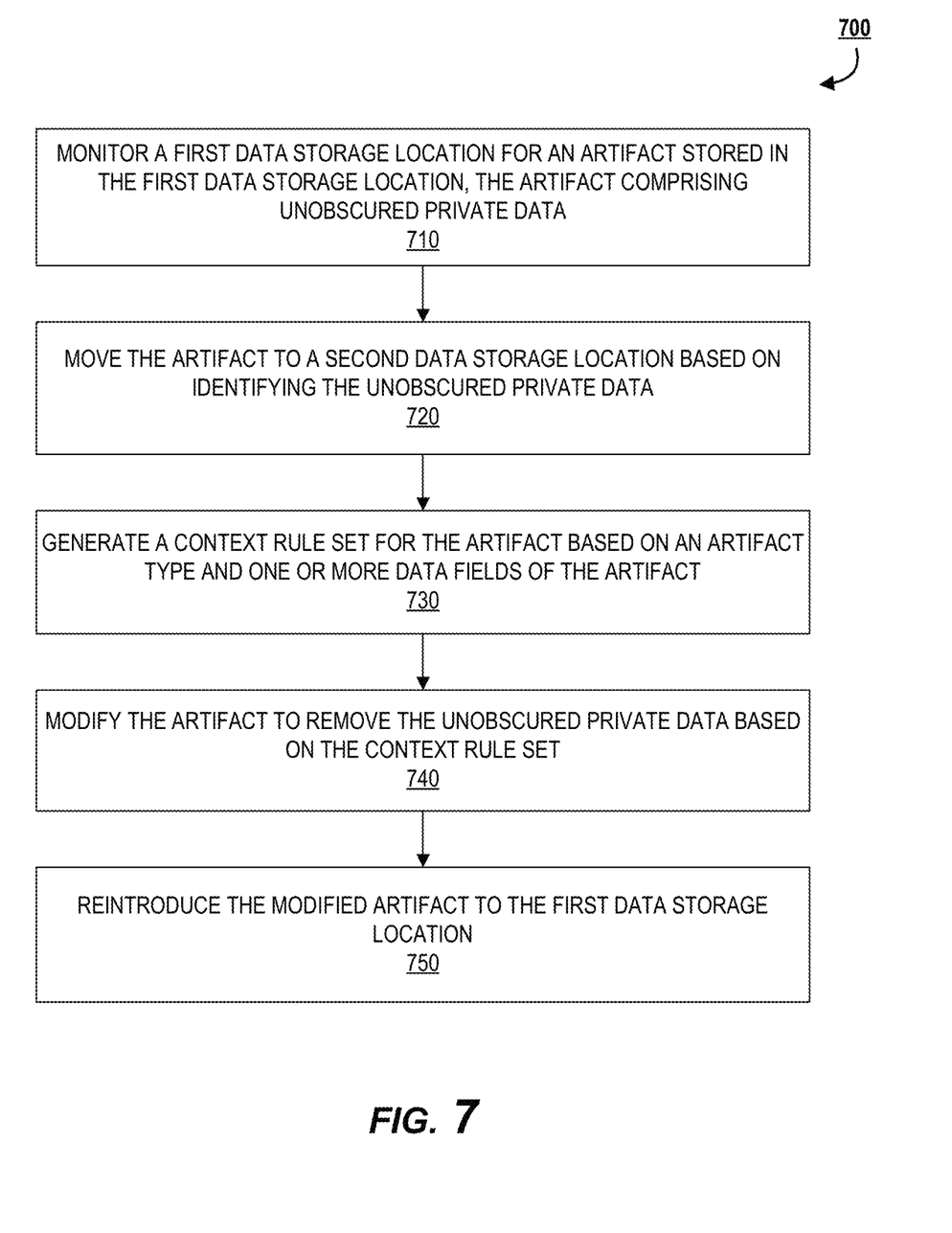
FIG. 7 provides a high level process flow for data storage identification and remediation, in accordance with one embodiment of the invention.

FIG. 7 provides a high level process flow for data storage identification and remediation, in accordance with one embodiment of the invention. As illustrated at block 710 of FIG. 7, the system is configured to monitor one or more data storage locations. In particular, the system monitors the data storage locations for stored artifacts comprising unobscured private data. The system may monitor and scan the data storage location using a crawler bot and data context identification as described with respect to FIG. 6. Similarly, as seen at block 720, the system is configured to move an artifact to a new data storage location, such as a quarantine storage location, based on identifying the unobscured private data. The system is also configured to generate a context rule set for the artifact based on an artifact type and one or more data fields of the artifact to determine the context or usage of the private data within the artifact and to determine whether additional processing or action is required.

Based on determining that additional action is required to remove unobscured private data from an artifact based on the context rule set, the system is configured to modify the artifact at block 740. In some embodiments, the system is configured to modify the artifact by removing or scrubbing the unobscured private data based on the requirements of the context rule set for the artifact type. In another embodiment, the system is configured to apply a mask to the artifact, wherein at least a portion of the artifact is modified with additional or alternative data. The masked data may be provided to the destination device for meeting the data requirements, while maintaining data anonymity. The masked data may remain usable by the system for directing the resource transfer while masking at least those portions not required by the data requirements. Non-limiting examples of alternative data include text (e.g., XXXX), symbols (e.g., *****), or the like to act as a placeholder for the unobscured private data without exposing the data itself. In some embodiments, the alternative data may be configured to function as proxy data for the unobscured private data, wherein the alternative proxy data enables the artifact to continue to function normally without revealing the unobscured private data. In yet another embodiment, the system may further comprises an encryption function configured to encrypt at least a portion of the artifact. At block 750, the system may be configured to reintroduce the modified artifact to an original or new data storage location following modification.

In some embodiments, the system may mistakenly flag an artifact for quarantine or additional processing (i.e., a false positive). In one embodiment, the system may automatically identify a false positive based on an assigned context rule set. In another embodiment, the presence of a false positive may be identified by a user or entity maintaining the system. The system may be configured to reintroduce an artifact back to an original data storage location following confirmation of a false positive. Furthermore, a machine learning model used to initially flag the artifact may be updated to correct for and reflect the newly identified false positive. In this way, the system may continually learn to accurately identify artifacts and anomalies.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with context-based data storage scrutinization and remediation.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for context-based data storage scrutinization and remediation, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 16/930,478 | DATA MODIFICATION SYSTEM FOR DYNAMIC ARTIFACT CORRECTION AND SECURE DATA STORAGE | Jul. 16, 2020 |

What is claimed is:

1. A system for context-based data scrutinization and capture, the system comprising:
a memory device with computer-readable program code stored thereon;
a processing device, wherein the processing device is configured to execute the computer-readable program code to:
monitor a data storage location using a crawler bot configured for scanning an artifact stored in the data storage location;
scan the artifact, using the crawler bot, for one or more data fields;
identify, based on scanning the artifact, unobscured private data in at least one of the one or more data fields;
identify, in response to identifying the unobscured private data, an artifact type for the artifact based on the one or more data fields;
remove, in response to identifying the unobscured private data, the artifact from the data storage location;
determine, based on the artifact type, a new data storage location for the artifact;
move, after removing the artifact from the data storage location, the artifact to the new data storage location;
determine, based on the artifact type and historical artifact information, a context of the artifact and a usage of the artifact;
determine, based on the context of the artifact and the usage of the artifact, whether to approve the artifact or flag the artifact;
move, in response to determining to approve the artifact, the artifact to the data storage location; and
move, in response to determining to flag the artifact, the artifact to a quarantine data storage location.

2. The system of claim 1 comprising a context identification component configured for identifying the artifact type for the artifact and generating a context rule set for the artifact.

3. The system of claim 2, wherein the context rule set defines usage of the unobscured private data compared to the artifact type and the one or more data fields.

4. The system of claim 2, wherein the data storage location is a first data storage location, and wherein capturing the artifact further comprises:

determining a second data storage location for the artifact based on the artifact type, the one or more data fields, and the context rule set for the artifact; and
moving the artifact from the first data storage location to the second data storage location.

5. The system of claim 1, wherein the processing device is further configured to train the crawler bot with sample artifact data and real-time artifact data stored in the data storage location.

6. The system of claim 5, wherein training the crawler bot further comprises leveraging a machine learning engine configured for identifying artifact types and data entries from a collection of artifacts.

7. The system of claim 1, wherein identifying the artifact type further comprises dividing the artifact into individual artifact components based on the one or more data fields.

8. The system of claim 1, wherein scanning the artifact for the one or more data fields further comprises identifying the one or more data fields using optical character recognition.

9. The system of claim 1, wherein the artifact is selected from a group consisting of data, a document, an image, a video, and a file.

10. A computer-implemented method for context-based data scrutinization and capture, the computer-implemented method comprising:
monitoring, with a processing device, a data storage location using a crawler bot configured for scanning an artifact stored in the data storage location;
scanning the artifact, using the crawler bot, for one or more data fields;
identifying, based on scanning the artifact, unobscured private data in at least one of the one or more data fields;
identifying, in response to identifying the unobscured private data, an artifact type for the artifact based on the one or more data fields;
removing, in response to identifying the unobscured private data, the artifact from the data storage location;
determining, based on the artifact type, a new data storage location for the artifact;
moving, after removing the artifact from the data storage location, the artifact to the new data storage location;
determining, based on the artifact type and historical artifact information, a context of the artifact and a usage of the artifact;
determining, based on the context of the artifact and the usage of the artifact, whether to approve the artifact or flag the artifact;
moving, in response to determining to approve the artifact, the artifact to the data storage location; and
moving, in response to determining to flag the artifact, the artifact to a quarantine data storage location.

11. The computer-implemented method of claim 10, wherein a context identification component is configured for identifying the artifact type for the artifact and generating a context rule set for the artifact.

12. The computer-implemented method of claim 11, wherein the context rule set defines usage of the unobscured private data compared to the artifact type and the one or more data fields.

13. The computer-implemented method of claim 11, wherein the data storage location is a first data storage location, and wherein capturing the artifact further comprises:
determining a second data storage location for the artifact based on the artifact type, the one or more data fields, and the context rule set for the artifact; and moving the artifact from the first data storage location to the second data storage location.

14. The computer-implemented method of claim 10 further comprising training the crawler bot with sample artifact data and real-time artifact data stored in the data storage location.

15. The computer-implemented method of claim 14, wherein training the crawler bot further comprises leveraging a machine learning engine configured for identifying artifact types and data entries from a collection of artifacts.

16. The computer-implemented method of claim 10, wherein identifying the artifact type further comprises dividing the artifact into individual artifact components based on the one or more data fields.

17. A computer program product for context-based data scrutinization and capture, wherein the computer program product comprises a non-transitory computer-readable medium comprising computer-readable instructions, the computer-readable instructions, when executed by a processing device, cause the processing device to:
monitor a data storage location using a crawler bot configured for scanning an artifact stored in the data storage location;
scan the artifact, using the crawler bot, for one or more data fields;
identify, based on scanning the artifact, unobscured private data in at least one of the one or more data fields;
identify, in response to identifying the unobscured private data, an artifact type for the artifact based on the one or more data fields;
remove, in response to identifying the unobscured private data, the artifact from the data storage location;
determine, based on the artifact type, a new data storage location for the artifact;
move, after removing the artifact from the data storage location, the artifact to the new data storage location;
determine, based on the artifact type and historical artifact information, a context of the artifact and a usage of the artifact;
determine, based on the context of the artifact and the usage of the artifact, whether to approve the artifact or flag the artifact;
move, in response to determining to approve the artifact, the artifact to the data storage location; and
move, in response to determining to flag the artifact, the artifact to a quarantine data storage location.

18. The computer program product of claim 17 comprising a context identification component configured for identifying the artifact type for the artifact and generating a context rule set for the artifact.

19. The computer program product of claim 18, wherein the context rule set defines usage of the unobscured private data compared to the artifact type and the one or more data fields.

20. The computer program product of claim 18, wherein the data storage location is a first data storage location, and wherein capturing the artifact further comprises:
determining a second data storage location for the artifact based on the artifact type, the one or more data fields, and the context rule set for the artifact; and
moving the artifact from the first data storage location to the second data storage location.

* * * * *

UNITED STATES PATENT AND TRADEMARK OFFICE
CERTIFICATE OF CORRECTION

PATENT NO.           : 11,580,257 B2  
APPLICATION NO.      : 16/930469  
DATED                : February 14, 2023  
INVENTOR(S)          : Govinda Rajulu Nelluri and Suhasini Mullapudi Page 1 of 1

It is certified that error appears in the above-identified patent and that said Letters Patent is hereby corrected as shown below:

On the Title Page

Item (72) should read:
Inventors: Govinda Rajulu Nelluri, Hyderabad (IN); Suhasini Mullapudi, Chennai (IN)

Signed and Sealed this
Eighteenth Day of July, 2023

Katherine Kelly Vidal
*Director of the United States Patent and Trademark Office*